(12) United States Patent
Hirano

(10) Patent No.: US 8,222,352 B2
(45) Date of Patent: Jul. 17, 2012

(54) SILICONE RESIN COMPOSITION

(75) Inventor: Keisuke Hirano, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 283 days.

(21) Appl. No.: 12/644,670

(22) Filed: Dec. 22, 2009

(65) Prior Publication Data

US 2010/0160577 A1 Jun. 24, 2010

(30) Foreign Application Priority Data

Dec. 24, 2008 (JP) .................................. 2008-328411
Dec. 24, 2008 (JP) .................................. 2008-328412

(51) Int. Cl.
*C08L 83/06* (2006.01)
*C08G 77/14* (2006.01)

(52) U.S. Cl. .......................................... 525/477; 528/33

(58) Field of Classification Search ........................ None
See application file for complete search history.

(56) References Cited

U.S. PATENT DOCUMENTS

| | | | | |
|---|---|---|---|---|
| 3,976,497 A * | 8/1976 | Clark | ...................... | 106/287.16 |
| 3,986,997 A * | 10/1976 | Clark | ........................... | 524/300 |
| 4,223,072 A * | 9/1980 | Baney et al. | ................... | 428/412 |
| 4,267,297 A * | 5/1981 | Hanada et al. | ................... | 528/18 |
| 4,275,118 A * | 6/1981 | Baney et al. | ................... | 428/412 |
| 4,298,655 A * | 11/1981 | Kray | .............. | 428/412 |
| 4,324,712 A * | 4/1982 | Vaughn, Jr. | ................... | 524/767 |
| 4,444,973 A * | 4/1984 | Schonfelder et al. | ........... | 528/28 |
| 4,476,281 A * | 10/1984 | Vaughn, Jr. | ................... | 524/767 |
| 4,486,503 A * | 12/1984 | Vaughn, Jr. | ................... | 428/412 |
| 4,554,187 A * | 11/1985 | Grape et al. | ................... | 427/387 |
| 4,734,479 A * | 3/1988 | Inoue et al. | ..................... | 528/18 |
| 4,978,702 A * | 12/1990 | Yuyama et al. | ............... | 524/266 |
| 2003/0236347 A1 * | 12/2003 | Furuya et al. | ................... | 524/588 |
| 2004/0254291 A1 * | 12/2004 | Kobayashi et al. | ........... | 524/588 |
| 2007/0225465 A1 * | 9/2007 | Akiike et al. | ................... | 528/15 |
| 2007/0260008 A1 * | 11/2007 | Saito et al. | ..................... | 524/547 |
| 2008/0217577 A1 * | 9/2008 | Hayes | ....................... | 252/182.29 |
| 2009/0163654 A1 * | 6/2009 | Hirano | ........................... | 524/783 |

FOREIGN PATENT DOCUMENTS

| | | |
|---|---|---|
| EP | 1 209 201 A1 | 5/2002 |
| EP | 1 736 500 A1 | 12/2006 |
| EP | 2 075 277 A2 | 7/2009 |
| EP | 2 154 175 A1 | 2/2010 |
| EP | 2 154 188 A1 | 2/2010 |
| EP | 2 180 351 A2 | 4/2010 |
| JP | 9-278901 A | 10/1997 |
| JP | 2000-265150 | 9/2000 |
| JP | 2001-200162 | 7/2001 |
| JP | 2004-502021 | 1/2004 |
| JP | 2005-513195 | 5/2005 |
| WO | WO 02/00808 A1 | 1/2002 |
| WO | WO 03/052019 A1 | 6/2003 |
| WO | WO 2008/065862 A1 | 6/2008 |

OTHER PUBLICATIONS

Office Action issued Jul. 29, 2011, in Japanese Patent Application No. 2008-328411.

Japanese Office Action issued on Apr. 15, 2011 in corresponding Japanese Application No. 2008-328411.

* cited by examiner

*Primary Examiner* — Robert S Loewe

(74) *Attorney, Agent, or Firm* — Oblon, Spivak, McClelland, Maier & Neustadt, L.L.P.

(57) ABSTRACT

A composition for a silicone resin containing a poly(methyl silsesquioxane) derivative having an alkoxysilyl group at an end of a molecule, and fine metal oxide particles having a reactive functional group on the surface thereof, wherein the composition further contains at least one compound selected from the group consisting of disilanol derivatives having silanol groups at both ends of a molecule and a monofunctional silane derivative represented by the formula (II):

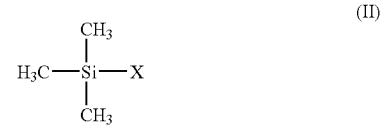

wherein X is an alkoxy group or a halogen atom. The silicone resin composition of the present invention can be suitably used as, for example, materials for encapsulating photosemiconductor elements for use in backlights for liquid crystal displays, traffic lights, outdoor big displays, advertisement sign boards, and the like.

15 Claims, No Drawings

SILICONE RESIN COMPOSITION

BACKGROUND OF THE INVENTION

1. Field of the Invention

The present invention relates to a composition for a silicone resin. More specifically, the present invention relates to a composition for a silicone resin having excellent transparency and high strength and flexibility, and a composition for a silicone resin having excellent transparency, high adhesiveness and tensile shearing strength, and excellent heat resistance. Also, the present invention relates to a silicone resin composition obtainable or obtained by reacting the composition and a method for producing a silicone resin composition, and a formed article made of the silicone resin composition.

2. Discussion of the Related Art

In the recent years, since silicone resins have excellent heat resistance, durability and weathering resistance, the silicone resins are increasingly used under severe operating environmental conditions. Especially, the silicone resins have excellent transparency because the silicone resins do not have absorption in the visible region, so that the silicone resins are suitably used in applications that require transparency and have severe operating environmental conditions.

For example, polydimethylsiloxanes generally have weak intermolecular forces, so that even when formed into a polymer, they exist in the form of a viscous liquid. In view of the above, as a method of improving strength of a polydimethylsiloxane derivative, a method including the steps of introducing a trifunctional T unit or a tetrafunctional Q unit into a molecule so as to take a cross-linking structure, thereby increasing a degree of cross-linking, and increasing the strength of the polydimethylsiloxane derivative is generally employed (see Japanese Patent Laid-Open No. 2001-200162). A method including the steps of introducing a bulky substituent such as a phenyl group, thereby increasing a degree of crystallization of the resin, and making the resin more rigid is also known (see Japanese Patent Laid-Open No. 2000-265150).

Japanese Unexamined Patent Publication No. 2005-513195 discloses a method of adding a filler to a silicone resin, thereby increasing the strength while keeping flexibility.

In addition, silicone-based pressure sensitive adhesives exhibit excellent moisture tolerance and electric insulation, so that the silicone-based pressure sensitive adhesives are widely used in electronic parts. With the miniaturization of electronic instruments and enlargement in memory capacities in the recent years, further quality improvements in the silicone-based pressure sensitive adhesives are desired because the production steps are complicated.

Conventionally, as a silicone-based adhesive, an adhesive, cross-linked silicone composition or a silicone elastomer or the like derived therefrom is used. However, since a silicone derived from a pure siloxane does not have a sufficient adhesiveness, a method including the step of introducing a functional group such as an epoxy group, an amino group, or a mercapto group into a resin to carry out an organic denaturization of the resin, or a method of subjecting a silicone to a primer treatment using an additive having the functional group is generally carried out (see Japanese Patent Laid-Open No. 2001-200162).

Japanese Patent Laid-Open No. 2000-265150 discloses a silicone composition having a low thermal expansion coefficient and high viscosity by adding silica particles having a small specific surface area. In Japanese Unexamined Patent Publication No. 2005-513195, adhesiveness is improved by using a processing aid such as a plasticizer.

In addition, as an adhesive with increased heat resistance, a silicone adhesive derived from a polyorganosiloxane natural rubber and a cross-linking polyalkoxysilane or the like without subjecting to the organic denaturation as mentioned above is proposed (see Japanese Unexamined Patent Publication No. 2004-502021).

SUMMARY OF THE INVENTION

The present invention relates to:

[1] a composition for a silicone resin containing:
   a poly(methyl silsesquioxane) derivative having an alkoxysilyl group at an end of a molecule, and
   fine metal oxide particles having a reactive functional group on the surface thereof,
wherein the composition further contains at least one compound selected from the group consisting of disilanol derivatives having silanol groups at both ends of a molecule and a monofunctional silane derivative represented by the formula (II):

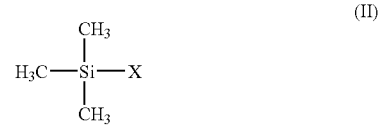

wherein X is an alkoxy group or a halogen atom;

[2] a silicone resin composition obtainable or obtained by the steps of:
(i) carrying out a polymerization reaction between
   fine metal oxide particles having a reactive functional group on the surface thereof and
   a poly(methyl silsesquioxane) derivative having an alkoxysilyl group at an end of a molecule, and
(ii) further carrying out a polymerization reaction between
   a product obtained in the step (i) and
   at least one compound selected from the group consisting of disilanol derivatives having silanol groups at both ends of a molecule and a monofunctional silane derivative represented by the formula (II):

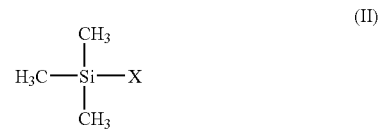

wherein X is an alkoxy group or a halogen atom;

[3] a method for producing a silicone resin composition, including the steps of:
(i) carrying out a polymerization reaction between
   fine metal oxide particles having a reactive functional group on the surface thereof and
   a poly(methyl silsesquioxane) derivative having an alkoxysilyl group at an end of a molecule, and
(ii) further carrying out a polymerization reaction between
   a product obtained in the step (i) and
   at least one compound selected from the group consisting of disilanol derivatives having silanol groups at both ends of a molecule and a monofunctional silane derivative represented by the formula (II):

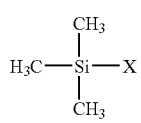

wherein X is an alkoxy group or a halogen atom; and

[4] a silicone resin formed article wherein the silicone resin composition as defined in the above [2] is molded into a desired form.

DETAILED DESCRIPTION OF THE INVENTION

The present invention relates to a composition for a silicone resin having excellent transparency and high strength and flexibility, a silicone resin composition obtainable or obtained by reacting the composition, and a method for producing the silicone resin composition, and a formed article made of the silicone resin composition. In addition, the present invention relates to a composition for a silicone resin having excellent transparency, high adhesiveness and tensile shearing strength, and excellent heat resistance, a silicone resin composition obtainable or obtained by reacting the composition, and a method for producing the silicone resin composition, and a formed article made of the silicone resin composition.

The composition for a silicone resin of the present invention exhibits some excellent effects that a silicone resin composition having excellent transparency and high strength and flexibility can be provided. The composition for a silicone resin of the present invention exhibits some excellent effects that a silicone resin composition having excellent transparency, and high adhesiveness and tensile shearing strength, and excellent heat resistance can be provided.

These and other advantages of the present invention will be apparent from the following description.

If a silicone resin is prepared in accordance with a method of Japanese Patent Laid-Open No. 2001-200162, from the viewpoint of resin strength, the resin becomes brittle, even though the resin has high strength. Also, if a bulky substituent such as a phenyl group is introduced as described in Japanese Patent Laid-Open No. 2000-265150, the overall resin becomes brittle even while the resin has an increased degree of crystallization, thereby increasing the strength of the resin. For these reasons, although these methods are excellent in surface protection or the like of a thin film made of a coating agent or the like, there is a disadvantage that it is difficult to use the resin in applications of thick films, applications necessitating bending property, or applications necessitating flexibility.

In addition, in a method of adding a filler as described in Japanese Unexamined Patent Publication No. 2005-513195, it is difficult to disperse a filler, thereby making it difficult to obtain a material having high transparency.

On the other hand, from the viewpoint of adhesiveness, although a functional group such as an epoxy group or an amino group gives excellent adhesiveness to a substrate, heat resistance is sufficient, so that the lowering of adhesive strength, discoloration, or the like takes place when exposed to a high temperature of 150° C. or higher for a long period of time. In addition, in the method described in Japanese Patent Laid-Open No. 2000-265150, since silica particles to be added are large and dispersibility is insufficient, a resin having worsened transparency is obtained. Also, in a case where a working aid is used in a manner as described in Japanese Unexamined Patent Publication No. 2005-513195, heat resistance is insufficient, while adhesiveness can be improved, so that the lowering of adhesive strength, discoloration or the like takes place when exposed to a high temperature for a long period of time.

In addition, although a silicone adhesive proposed in Japanese Unexamined Patent Publication No. 2004-502021 has excellent heat resistance, adhesive strength is still insufficient, and further improvement is desired.

In view of the above, as a result of intensive studies in order to solve the above disadvantages, the present inventors have found that fine metal oxide particles having a reactive functional group on the surface thereof as a filler are reacted with a part of an alkoxysilyl group contained in a poly(methyl silsesquioxane) derivative as a silicone resin raw material to cross-link, whereby the resin strength can be increased, while the fine particles are well dispersed and transparency is maintained; and further that since a specified silane derivative is used as a raw material for a silicone resin, flexibility peculiarly owned by a silicone can be kept, and adhesiveness to a substrate can be improved without having to introduce an organic functional group, depending upon the kinds of the silane derivative, and furthermore heat resistance is improved. The present invention has been perfected thereby.

The composition for a silicone resin of the present invention contains:

a poly(methyl silsesquioxane) derivative having an alkoxysilyl group at an end of a molecule, and fine metal oxide particles having a reactive functional group on the surface thereof, wherein the composition further contains at least one member selected from disilanol derivatives and a monofunctional silane derivative described later as a specified silane derivative, whereby a silicone resin composition having various properties can be provided. Specifically, there are the following two embodiments.

Embodiment 1: a Composition for a Silicone Resin Containing:

a poly(methyl silsesquioxane) derivative having an alkoxysilyl group at an end of a molecule, and fine metal oxide particles having a reactive functional group on the surface thereof, wherein the composition further contains a disilanol derivative having silanol groups at both ends of a molecule; and Embodiment 2: a Composition for a Silicone Resin Containing:

a poly(methyl silsesquioxane) derivative having an alkoxysilyl group at an end of a molecule, and fine metal oxide particles having a reactive functional group on the surface thereof, wherein the composition further contains a monofunctional silane derivative represented by the formula (II):

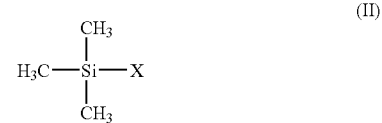

wherein X is an alkoxy group or a halogen atom.

Here, the composition for a silicone resin of the present invention embraces an embodiment where both of the disilanol derivative and the monofunctional silane derivative mentioned above are contained as specified silane derivatives, in other words, an embodiment where Embodiment 1 and Embodiment 2 are combined.

The poly(methyl silsesquioxane) derivative is formed into a condensed structure having a high cross-linking density, so that those derivatives having large molecular weights are less likely to be obtained. In the present invention, since a polymerization reaction between a poly(methyl silsesquioxane) derivative having an alkoxysilyl group at an end of a molecule and fine metal oxide particles having a reactive functional group on the surface thereof is carried out to allow the components to cause an interaction such as a covalent bonding or a hydrogen bonding between a part of the alkoxysilyl group of the poly(methyl silsesquioxane) derivative and a part of functional groups of the fine metal oxide particles to cross-link, an overall resin having an apparently larger molecular weight is formed, while well dispersing the fine metal oxide particles to maintain transparency; therefore, it is made possible that the resin has high strength showing excellent properties in mechanical strength, toughness, abrasion resistance, scratching resistance and the like.

In view of the above, in Embodiment 1, a silicone unit having high flexibility is formed by carrying out a cross-linking reaction between the poly(methyl silsesquioxane) derivative and the fine metal oxide particles mentioned above, and thereafter carrying out a polycondensation reaction between an unreacted alkoxysilyl group in the poly(methyl silsesquioxane) derivative and a disilanol derivative having silanol groups at both ends of a molecule, so that a silicone resin composition having excellent transparency and high strength and flexibility can be obtained.

Also, in Embodiment 2, the degree of cross-linking of the resin can be adjusted by carrying out a cross-linking reaction between the poly(methyl silsesquioxane) derivative and the fine metal oxide particles mentioned above, and thereafter blocking an unreacted alkoxysilyl group in the poly(methyl silsesquioxane) derivative with a monofunctional silane derivative represented by the formula (II), in other words, carrying out a polycondensation reaction between a polymer obtained by the cross-linking reaction and the monofunctional silane derivative, so that heat resistance can also be improved, whereby a silicone resin composition having excellent transparency, high strength, and excellent heat resistance can be obtained. In addition, the silicone resin composition thus obtained does not have tackiness (adhesiveness) at room temperature, so that the silicone resin composition has excellent handling property, and its tackiness is exhibited by heating to show high adhesiveness.

The poly(methyl silsesquioxane) derivative in Embodiments 1 and 2 is a generic term for a silicone resin, of which ratio of the number of oxygen atoms to the number of silicon atoms satisfies 1.5, and the poly(methyl silsesquioxane) derivative having an alkoxysilyl group at an end of a molecule (hereinafter also simply referred to as "poly(methyl silsesquioxane) derivative") includes, for example, a compound having as a constituting unit a compound represented by the formula (I):

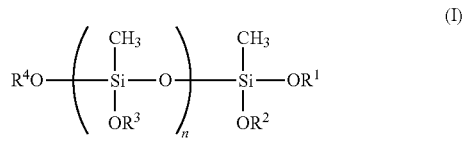

wherein each of $R^1$, $R^2$, $R^3$ and $R^4$ is independently a hydrogen atom, an alkyl group, or an aromatic group, and n is a positive integer, with proviso that $R^1$, $R^2$, and $R^4$ are not concurrently hydrogen atoms, or not concurrently aromatic groups, and that n number of $R^3$'s may be identical or different.

Here, the above-mentioned constituting unit is polycondensed to give a compound having a random structure, a ladder structure, a cage structure, or the like of an Si—O—Si backbone.

Each of $R^1$, $R^2$, $R^3$ and $R^4$ in the formula (I) is independently a hydrogen atom, an alkyl group, or an aromatic group, with proviso that $R^1$, $R^2$, and $R^4$ are not concurrently hydrogen atoms, or not concurrently aromatic groups, and that n number of $R^3$'s may be identical or different. In other words, at least one of $R^1$, $R^2$, and $R^4$ is an alkyl group.

The alkyl group of $R^1$, $R^2$, $R^3$ and $R^4$ in the formula (I) has the number of carbon atoms of preferably from 1 to 4, and more preferably from 1 to 2, from the viewpoint of reactivity on the surface of the fine particles and a rate of hydrolysis. Specific examples thereof include a methyl group, an ethyl group, a propyl group, and the like. Among them, a methyl group is preferred, and it is preferable that all of $OR^1$, $OR^2$, $OR^3$, and $OR^4$ are methoxy groups. Here, it is preferable that n number of $OR^3$'s all are methoxy groups.

n in the formula (I) is a positive integer, and n is an integer of preferably from 1 to 3, from the viewpoint of solubility to a solvent.

The poly(methyl silsesquioxane) derivative represented by the formula (I) includes compounds having a random structure of Si—O—Si backbone (random form), compounds having a ladder structure of Si—O—Si backbone (ladder form), compounds having a cage structure of Si—O—Si backbone (cage form), compounds in which the cage form is partially opened (partially opened cage form), and the like. These compounds can be used alone or a combination of two or more kinds. Among them, a partially hydrolyzed condensate of a poly(methyl silsesquioxane), in which all of $R^1$, $R^2$, $R^3$ (all n number of $R^3$'s), and $R^4$ are methyl groups, is preferred. The partially hydrolyzed condensate as used herein refers to a product obtained by hydrolyzing a mixture of poly(methyl silsesquioxane) derivatives having various structures and polycondensing the hydrolyzed mixture, and the composition is not particularly limited.

Preferred commercially available poly(methyl silsesquioxane) derivatives represented by the formula (I) include "X-40-9225," "X-40-9246," "KR500," "KC89," and the like, each commercially available from Shin-Etsu Chemical Co., Ltd. These poly(methyl silsesquioxane) derivatives can be used alone or in a combination of two or more kinds.

The poly(methyl silsesquioxane) derivative in the present invention has a molecular weight of preferably from 200 to 5000, more preferably from 200 to 3000, and even more preferably from 400 to 3000. Here, in a case where two or more kinds of the poly(methyl silsesquioxane) derivatives are used, it is desired that a molecular weight of each poly(methyl silsesquioxane) derivative is within the above range. However, those having a molecular weight outside the above range may be partly included, so long as a weighted average molecular weight of the overall poly(methyl silsesquioxane) derivative falls within the above range. In the present specification, the molecular weight of the silicone derivative is measured by gel permeation chromatography (GPC).

The alkoxy group is contained in an amount of preferably from 10 to 50% by weight, more preferably from 20 to 48% by weight, and even more preferably from 24 to 46% by weight, per one molecule of the poly(methyl silsesquioxane) derivative, from the viewpoint of reactivity. The amount of the alkoxy group contained per one molecule of the poly (methyl silsesquioxane) derivative as referred to herein can be measured in accordance with the method described in EXAMPLES set forth below.

The poly(methyl silsesquioxane) derivative having an alkoxysilyl group at an end of a molecule in the composition for a silicon resin of Embodiment 1 is contained in an amount of preferably from 50 to 99% by weight, more preferably from 60 to 95% by weight, and even more preferably from 70 to 90% by weight.

The poly(methyl silsesquioxane) derivative having an alkoxysilyl group at an end of a molecule in the composition for a silicon resin of Embodiment 2 is contained in an amount of preferably from 60 to 99% by weight, more preferably from 70 to 95% by weight, and even more preferably from 80 to 90% by weight.

In the present invention, the composition for a silicone resin of Embodiment 1 contains, in addition to the above poly(methyl silsesquioxane) derivative, a disilanol derivative having silanol groups at both ends of a molecule (hereinafter also simply referred to as a disilanol derivative) as a silicone derivative, from the viewpoint of giving flexibility. The disilanol derivative can form a silicone unit having an even higher flexibility by carrying out a polycondensation reaction with the above poly(methyl silsesquioxane) derivative. The disilanol derivative having silanol groups at both ends of a molecule in Embodiment 1 includes, for example, a compound represented by the following formula (III):

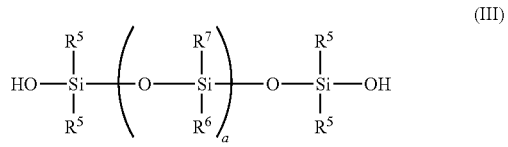

(III)

wherein each of $R^5$, $R^6$, and $R^7$ is independently an unsubstituted or substituted monovalent saturated hydrocarbon group, or an alkenyl group having 2 to 10 carbon atoms; a is an integer of 1 or more, with proviso that the a number of $R^6$ may be identical or different, and the a number of $R^7$ may be identical or different.

Each of $R^5$, $R^6$, and $R^7$ in the formula (III) is independently an unsubstituted or substituted monovalent saturated hydrocarbon group, or an alkenyl group having 2 to 10 carbon atoms. Specific examples include alkyl groups, such as a methyl group, an ethyl group, a propyl group, an isopropyl group, a butyl group, an isobutyl group, a tert-butyl group, a pentyl group, a neopentyl group, a hexyl group, a heptyl group, an octyl group, a nonyl group, a decyl group, and a dodecyl group; aryl groups, such as a phenyl group, a tolyl group, a xylyl group, a naphthyl group, and a biphenylyl group; cycloalkyl groups, such as a cyclopentyl group, a cyclohexyl group, and a cycloheptyl group; aralkyl groups, such as a benzyl group, a phenylethyl group, a phenylpropyl group, a methylbenzyl group; and groups where one or more hydrogen atoms of these monovalent saturated hydrocarbon groups are substituted with a halogen atom such as a fluorine atom, a chlorine atom, or a bromine atom, a cyano group, or the like, including, for example, a chloromethyl group, a 2-bromoethyl group, a 3-chloropropyl group, a 3,3,3-trifluoropropyl group, a chlorophenyl group, a fluorophenyl group, a cyanoethyl group, and a 3,3,4,4,5,5,6,6,6-nonafluorohexyl group; alkenyl groups having 2 to 10 carbon atoms, such as a vinyl group, an allyl group, a propenyl group, an isopropenyl group, a butenyl group, a pentenyl group, a hexenyl group, and a cyclohexenyl group. Among them, a methyl group, a phenyl group, a vinyl group, or a hexenyl group is preferred.

a in the formula (III) is an integer of 1 or more, and a is preferably an integer of from 1 to 50, and an integer of from 1 to 40, from the viewpoint of flexibility and compatibility.

The disilanol derivative represented by the formula (III) includes "X-21-3153," "X-21-5841," and "KF9701," each commercially available from Shin-Etsu Chemical Co., Ltd.; "DMS-S12," "DMS-S14," and "DMS-S151" each commercially available from Gelest, and the like. These silanol derivatives can be used alone or in a combination of two or more kinds. Among them, "X-21-3153," "X-21-5841," "DMS-S12," and "DMS-S14" are preferred.

The disilanol derivative represented by the formula (III) has a molecular weight of preferably from 200 to 2000, and more preferably from 200 to 1000. Here, in a case where two or more kinds of the disilanol derivatives are used, it is desired that a molecular weight of each disilanol derivative is within the above range. However, those having a molecular weight outside the above range may be partly included, so long as a weighted average molecular weight of the overall disilanol derivative falls within the above range.

The silanol group of the disilanol derivative represented by the formula (III) has a functional group equivalency of preferably from 100 to 1000, more preferably from 100 to 800, and even more preferably from 100 to 500, from the viewpoint of affinity with the fine metal oxide particles. The functional group equivalency of the silanol group as used herein can be measured by $^1$H-NMR.

The disilanol derivative having silanol groups at both ends of a molecule is contained in an amount of preferably from 1 to 25% by weight, more preferably from 3 to 20% by weight, and even more preferably from 5 to 20% by weight, of the composition for a silicon resin of Embodiment 1.

In addition, in the present invention, the composition for a silicon resin of Embodiment 2 contains a monofunctional silane derivative represented by the formula (II):

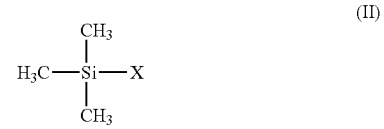

(II)

wherein X is an alkoxy group or a halogen atom, from the viewpoint of exhibiting tackiness (adhesiveness) under heating.

X in the formula (II) is an alkoxy group or a halogen atom, and the number of carbon atoms of the alkyl group in the alkoxy group is preferably from 1 to 4, and more preferably from 1 to 2, from the viewpoint of reactivity. Specific examples of the alkoxy group include a methoxy group, an ethoxy group, a propoxy group, and the like, and specific examples of the halogen atom include a fluorine atom, a chlorine atom, a bromine atom, and the like. Among them, a chlorine atom is preferred, from the viewpoint of reactivity.

The monofunctional silane derivative represented by the formula (II) includes methoxytrimethylsilane, chlorotrimethylsilane, ethoxytrimethylsilane, and the like, and these monofunctional silane derivatives can be used alone or in a combination of two or more kinds.

Preferred commercially available products of the monofunctional silane derivatives represented by the formula (II) include "LS-510," "KA31," and the like, each commercially available from Shin-Etsu Chemical Co., Ltd. These commercially available products can be used alone or in a combination of two or more kinds.

The monofunctional silane derivative represented by the formula (II) has a molecular weight of preferably from 100 to 160, and more preferably from 100 to 140.

The monofunctional silane derivative represented by the formula (II) is contained in an amount of preferably from 1 to 40% by weight, more preferably from 5 to 30% by weight, and even more preferably from 10 to 20% by weight, of the composition for a silicone resin of Embodiment 2.

In addition, the poly(methyl silsesquioxane) derivative and the monofunctional silane derivative represented by the formula (II) mentioned above in the composition for a silicone resin of Embodiment 2 are in a weight ratio, i.e. poly(methyl silsesquioxane) derivative/monofunctional silane derivative, of preferably from 60/40 to 99/1, more preferably from 70/30 to 95/5, and even more preferably from 80/20 to 90/10, from the viewpoint of strength when formed into a formed article.

In the present invention, other silicone derivatives besides the poly(methyl silsesquioxane) derivative, the disilanol derivative, and the monofunctional silane derivative mentioned above may be contained within the range that would not impair the effects of the present invention. Other silicone derivatives include known silicone derivatives. The poly(methyl silsesquioxane) derivative and the disilanol derivative mentioned above are contained in a total amount of preferably 80% by weight or more, more preferably 90% by weight, and even more preferably substantially 100% by weight, of a total amount of the silicone derivative in Embodiment 1. The poly(methyl silsesquioxane) derivative and the monofunctional silane derivative mentioned above are contained in a total amount of preferably 80% by weight or more, more preferably 90% by weight, and even more preferably substantially 100% by weight, of a total amount of the silicone derivative in Embodiment 2.

The fine metal oxide particles having a reactive functional group on the surface thereof in Embodiments 1 and 2 include those made of titanium oxide, zirconium oxide, barium titanate, zinc oxide, lead titanate, silicon dioxide, alumina, and the like. These metal oxides can be used alone or in a combination of two or more kinds. Among them, it is desired that the fine metal oxide particles are made of at least one metal oxide selected from the group consisting of titanium oxide, zinc oxide, zirconium oxide, barium titanate, and silicon dioxide, from the viewpoint of a high refractive index. As the titanium oxide, either a rutile type titanium oxide or an anatase type titanium oxide may be used.

The reactive functional group in the fine metal oxide particles includes a hydroxyl group, an isocyanate group, an amino group, a mercapto group, a carboxy group, an epoxy group, a vinyl unsaturated group, a halogen group, an isocyanurate group, and the like.

The amount of the reactive functional group contained in the fine reactive metal oxide particles on the surface thereof can be obtained depending upon an amount of the fine particles, surface area of the fine particles, an amount of a reacted surface treatment agent or the like. In the present invention, fine particles satisfying that an amount of the reactive functional group reacted with the surface treatment agent is 0.1% by weight or more of the weight of the fine particles are referred to as "fine metal oxide particles having a reactive functional group on the surface thereof." Here, the amount reacted is regarded as an amount of a reactive functional group contained, and the amount of the reactive functional group contained in the fine metal oxide particles is not particularly limited, so long as the amount is 0.1% by weight or more. Here, in the present specification, the amount of the reactive functional group contained in the fine metal oxide particles on the surface thereof can be measured in accordance with a method described in Examples set forth below, and the phrase "the amount of the reactive functional group contained" means "amount contained" and/or "existing amount" of the reactive functional group.

In addition, the amount of the reactive functional group contained in the fine metal oxide particles on the surface thereof can be lowered by, for example, reacting the fine particles with a solution prepared by dissolving methyltrimethoxysilane in an organic solvent. In addition, the amount of the reactive functional group contained on the surface of the fine particles can be lowered by baking the fine particles at a high temperature.

As the fine metal oxide particles, those produced according to a known method can be used. Among them, those obtained according to at least one production methods selected from the group consisting of a hydrothermal synthesis method, a sol-gel method, a supercritical hydrothermal synthesis method, a co-precipitation method, and a homogenous precipitation method are preferred, from the viewpoint of evenness of the sizes of the particles and formation of the fine particles.

The fine metal oxide particles have an average particle size of preferably from 1 to 100 nm, more preferably from 1 to 70 nm, and even more preferably from 1 to 20 nm, from the viewpoint of transparency of a formed article made of the resulting composition. In the present specification, the average particle size of the fine metal oxide particles can be measured in accordance with a particle size measurement of a dispersion of particles by dynamic light scattering method, or a direct observation with a scanning electron microscope.

Here, as the fine metal oxide particles, those prepared in a dispersion may be used, from the viewpoint of dispersion stability, which is also referred to as "a dispersion of the fine metal oxide particles." The dispersion medium includes water, alcohols, ketone solvents, acetamide solvents, and the like. It is preferable to use water, methanol, methyl butyl ketone, or dimethylacetamide. The amount of the fine metal oxide particles (solid content) in the dispersion is preferably from 10 to 40% by weight, more preferably from 15 to 40% by weight, and even more preferably from 20 to 40% by weight, from the viewpoint of efficiently carrying out a reaction on the surface of the fine particles. As the dispersion of fine metal oxide particles, for example, commercially available products of a dispersion of fine titanium oxide particles of NEOSUNVEIL or QUEEN TITANIC Series commercially available from Catalyst & Chemicals Ind. Co., Ltd. (CCIC), or Tynoc commercially available from Taki Chemical Co., Ltd.; a dispersion of fine zirconium oxide particles of ZSL Series commercially available from Daiichi Kigenso Kagaku Kogyo Co., Ltd., NZD Series commercially available from Sumitomo Osaka Cement Co., Ltd., Nano-Use Series commercially available from Nissan Chemical Industries, Ltd., a dispersion of silicon dioxide (silica) of SNOWTEX commercially available from Nissan Chemical Industries, Ltd., or a dispersion of alumina of alumina sol commercially available from Nissan Chemical Industries, Ltd. can be used.

The fine metal oxide particles are contained in an amount of preferably from 1 to 80 parts by weight, more preferably from 10 to 70 parts by weight, and even more preferably from 20 to 60 parts by weight, based on 100 parts by weight of a total amount of the poly(methyl silsesquioxane) derivative and the silane derivative.

The fine metal oxide particles in the composition for a silicone resin of Embodiment 1 are contained in an amount of preferably from 1 to 80 parts by weight, more preferably from 10 to 70 parts by weight, and even more preferably from 20 to 60 parts by weight, based on 100 parts by weight of a total amount of the poly(methyl silsesquioxane) derivative and the disilanol derivative.

The fine metal oxide particles in the composition for a silicone resin of Embodiment 2 are contained in an amount of preferably from 1 to 80 parts by weight, more preferably from 10 to 70 parts by weight, and even more preferably from 20 to 60 parts by weight, based on 100 parts by weight of a total amount of the poly(methyl silsesquioxane) derivative and the monofunctional silane derivative represented by the formula (II).

Besides the poly(methyl silsesquioxane) derivative, the disilanol derivative, and the fine metal oxide particles mentioned above in Embodiment 1, or besides the poly(methyl silsesquioxane) derivative, the monofunctional silane derivative, and the fine metal oxide particles mentioned above in Embodiment 2, the composition for a silicone resin of the present invention may contain an additive, such as an anti-aging agent, a modifying agent, a surfactant, a dye, a pigment, a discoloration preventive, or an ultraviolet absorbent, within the range that would not impair the effects of the present invention.

The silicone resin composition of the present invention is obtained by carrying out a polymerization reaction of the composition for a silicone resin of the present invention. Specifically, the silicone resin compositions of each of the embodiments will be explained by giving their preferred methods for production.

The silicone resin composition of Embodiment 1 can be prepared by carrying out a polymerization reaction between
a product obtainable or obtained by carrying out a polymerization reaction of a resin solution containing a poly(methyl silsesquioxane) derivative with a dispersion of the above fine metal oxide particles at 40° to 80° C., and
a resin solution containing a disilanol derivative at 40° to 80° C.

A preferred method for producing a silicone resin composition of Embodiment 1 includes a method including the steps of:
carrying out a polymerization reaction between a poly(methyl silsesquioxane) derivative and fine metal oxide particles [step (1-A)]; and
further carrying out a polymerization reaction between a product obtained in the step (1-A) and a disilanol derivative [step (1-B)].

Specific examples of the step (1-A) include, for example, the steps of adding a resin solution prepared by dissolving a poly(methyl silsesquioxane) derivative in an organic solvent such as methanol, ethanol, 2-propanol, or tetrahydrofuran, so as to have a concentration of preferably from 20 to 50% by weight dropwise to a solution prepared by adding an organic solvent such as methanol, ethanol, 2-methoxyethanol, 2-propanol, or tetrahydrofuran to a dispersion of fine metal oxide particles while stirring, and allowing the components to react at 40° to 80° C. for 1 to 3 hours, whereby forming a cross-linked structure between the poly(methyl silsesquioxane) derivative and the fine metal oxide particles. The resulting product is subjected to the step (1-B).

Specific examples of the step (1-B) include, for example, the step of adding a resin solution prepared by dissolving a disilanol derivative in an organic solvent such as methanol, ethanol, 2-propanol, or tetrahydrofuran, so as to have a concentration of preferably from 20 to 50% by weight dropwise to a product obtained in step (1-A), while mixing, and allowing the components to react at 40° to 80° C. for 1 to 3 hours, and the like. Here, the concentration and the viscosity of the reaction mixture can be adjusted by subjecting the reaction mixture obtained to a step of distilling off the solvent under a reduced pressure to concentrate, or the like.

The silicone resin composition of Embodiment 2 can be prepared by carrying out a polymerization reaction between
a product obtainable or obtained by carrying out a polymerization reaction of a resin solution containing a poly(methyl silsesquioxane) derivative with the above dispersion of fine metal oxide particles at 40° to 80° C., and
a monofunctional silane derivative at 40° to 80° C.

A preferred method for producing a silicone resin composition of Embodiment 2 includes a method including the steps of:
carrying out a polymerization reaction between:
fine metal oxide particles having a reactive functional group on the surface thereof, and
a poly(methyl silsesquioxane) derivative having an alkoxysilyl group at an end of a molecule [step (2-A)]; and
further carrying out a polymerization reaction between
a product obtained in the step (2-A) and
a monofunctional silane derivative represented by the formula (II) [step (2-B)].

Specific examples of the step (2-A) include, for example, the steps of adding a resin solution prepared by dissolving a poly(methyl silsesquioxane) derivative in an organic solvent such as methanol, ethanol, 2-propanol, or tetrahydrofuran, so as to have a concentration of preferably from 20 to 50% by weight dropwise to a solution prepared by adding an organic solvent such as methanol, ethanol, 2-methoxyethanol, 2-propanol, or tetrahydrofuran to a dispersion of fine metal oxide particles while stirring, and allowing the components to react at 40° to 80° C. for 1 to 3 hours, whereby forming a cross-linked structure between the poly(methyl silsesquioxane) derivative and the fine metal oxide particles. The resulting product is subjected to the step (2-B).

Specific examples of the step (2-B) include, for example, the step of adding a resin solution prepared by dissolving a monofunctional silane derivative in an organic solvent such as methanol, ethanol, 2-propanol, or tetrahydrofuran, so as to have a concentration of preferably from 20 to 50% by weight dropwise to a product obtained in step (2-A), while mixing, and allowing the components to react at 40° to 80° C. for 1 to 3 hours, and the like. Here, the concentration and the viscosity of the reaction mixture can be adjusted by subjecting the reaction mixture obtained to a step of distilling off the solvent under a reduced pressure to concentrate, or the like.

The silicone resin composition in each of the embodiments thus obtained is applied over a release sheet of which surface is subjected to removal treatment (for example, polyethylene substrate) in an appropriate thickness according to a method such as casting, spin-coating, or roll-coating, and dried at a temperature so as to enable removal of the solvent, whereby the silicone resin composition can be molded into a sheet-like form. Here, a temperature for drying a resin solution cannot be unconditionally determined because the temperature differs depending upon the kinds of the resins and the solvents, the temperature for drying is preferably from 80° to 150° C. In addition, the drying may be carried out in two divided stages, and the silicone resin composition of Embodiment 1 can be subjected to drying procedures in two divided stages in a manner that the temperature for a first-stage drying is from 90° to 120° C., and that the temperature for a second-stage drying is from 130° to 150° C.

The silicone resin composition of the present invention has excellent transparency, so that the silicone resin composition has a high light transmittance. For example, when the silicone resin composition is molded into a sheet-like form having a thickness of from 10 to 500 μm, transmittance against an incidence of light having a wavelength of from 400 to 700 nm is preferably 80% or more, more preferably from 85% or more, and even more preferably from 90 to 100%. Here, light transmittance as used herein is measured in accordance with the method described in Examples set forth below.

In addition, the refractive index of the silicone resin composition of the present invention is such that in a case where the silicone resin composition is molded into a sheet-like form having a thickness of from 10 to 500 μm, the refractive index of the silicone resin composition is preferably from 1.42 to 1.50, more preferably from 1.44 to 1.50, and even more preferably from 1.45 to 1.50.

In another embodiment of the present invention, a silicone resin formed article obtainable or obtained by molding the silicone resin composition of the present invention.

As the molding method, a known method in the field of art can be used.

For example, the silicone resin formed article obtainable or obtained by molding the silicone resin composition of Embodiment 1 is not particularly limited. It is preferable that the formed article is at least one member selected from the group consisting of high-refractive index silicone resins, microlens, materials for encapsulating photosemiconductor elements, pressure sensitive adhesives, sealants, silicone sheets, and flexible substrates, from the viewpoint of benefiting from the properties of transparency and a high refractive index.

In addition, the silicone resin formed article obtainable or obtained by molding a silicone resin composition of Embodiment 2 includes a silicone-based pressure sensitive adhesive sheet obtainable or obtained by applying a silicone resin composition of Embodiment 2 on a substrate, and drying the coating thereon.

The silicone-based pressure sensitive adhesive sheet is not particularly limited in its form and size, and can be suitably used as interlaminar adhesive agents for a substrates, and adhesive agents for electric and electronic part materials for which heat resistance and light fastness are required.

EXAMPLES

The following examples further describe and demonstrate embodiments of the present invention. The examples are given solely for the purposes of illustration and are not to be construed as limitations of the present invention.
[Molecular Weight of Silicone Derivative]
The molecular weight of a silicone derivative is obtained by calculation based on polystyrenes in accordance with gel permeation chromatography (GPC).
[Alkoxy Group Content of Silicone Derivative]
The alkoxy group content of a silicone derivative is calculated from quantification in accordance with $^1$H-NMR using an internal standard substance and a weight loss in accordance with a differential thermogravimetric analysis.
[Functional Group Equivalency of Silanol Group of Silicone Derivative]
The functional group equivalency is measured according to $^1$H-NMR using an internal standard substance.
[Average Particle Size of Fine Metal Oxide Particles]
The average particle size of the fine metal oxide particles as used herein means an average particle size of a primary particle, namely a volume-median particle size ($D_{50}$) measured in accordance with dynamic light scattering method with a particle dispersion of fine metal oxide particles.

[Content of Reactive Functional Group on Surface of Fine Metal Oxide Particles]
The content of a reactive functional group is calculated by adding ethyltrimethoxysilane as a surface treatment agent to a dispersion of fine metal oxide particles to react, allowing the fine particles to aggregate and precipitate by centrifugation or a pH fluctuation, collecting the fine particles by filtration, washing, drying, and obtaining a weight loss by a differential thermogravimetric analysis.
[Light Transmittance of Silicone Resin Composition]
The light transmittance at a wavelength of 400 nm is calculated by measuring a transmittance spectrum in the visible light region of from 400 to 800 nm with a spectrophotometer (U-4100, commercially available from Hitachi High-Technologies Corporation).

Example 1-1

In a container equipped with a stirrer, a reflux condenser, and a nitrogen inlet tube, an aqueous dispersion of zirconium oxide having an average particle size of 7 nm (trade name "NZD-3007," commercially available from Sumitomo Osaka Cement Co., Ltd., solid content: 40% by weight, containing a hydroxyl group as a reactive functional group, content of reactive functional group: 1.0% by weight or more) as fine metal oxide particles having a reactive functional group on the surface thereof was placed in an amount of 9.0 g (40 parts by weight, based on 100 parts by weight of the silicone derivative), and further 9.0 g of methanol and 9.0 g of 2-methoxyethanol were added thereto, and a pH of the solution was adjusted with a concentrated hydrochloric acid to 2.5 to 3.3. Thereto was added dropwise a solution prepared by dissolving 5.0 g of a poly(methyl silsesquioxane) derivative having an alkoxysilyl group at an end of a molecule [trade name "X-40-9225," commercially available from Shin-Etsu Chemical Co., Ltd., in which $R^1$, $R^2$, $R^3$ and $R^4$ of the formula (I) are each a methyl group, molecular weight: from 2000 to 3000, methoxy content 24% by weight] in 5.0 g of 2-propanol with a dropping funnel, while mixing, and the components were reacted at 60° C. for 1 hour. Thereafter, a solution prepared by dissolving 4.0 g of a disilanol derivative having silanol groups at both ends of a molecule [trade name "X-21-3153," commercially available from Shin-Etsu Chemical Co., Ltd., in which $R^5$, $R^6$ and $R^7$ of the formula (III) are each a methyl group, molecular weight: about 300, functional group equivalency: 150] in 4.0 g of 2-propanol was added dropwise thereto with a dropping funnel, and the components were reacted at 60° C. for 2 hours. Thereafter, the reaction mixture was cooled to room temperature, 25° C., to give a silicone resin composition. The solvents were distilled off under a reduced pressure to concentrate the resulting composition, and the concentrate was applied to a PET substrate subjected to a removal treatment with a silicone-based remover so as to form a film having a thickness of 100 μm, and heated at 100° C. for 1 hour, and then at 150° C. for 1 hour to prepare a formed article a (silicone sheet).

In addition, the solvents were distilled off to concentrate the above composition, and the concentrate was applied to a PET substrate subjected to a removal treatment with a silicone-based remover so as to form a film having a thickness of 100 μm, and heated at 100° C. for 8 hours to prepare a formed article b (silicone sheet).

Example 1-2

The same procedures as in Example 1-1 were carried out except that an aqueous dispersion of silica having an average particle size of 20 nm (trade name "SNOWTEX OX," commercially available from Nissan Chemical Industries, Ltd., solid content: 20% by weight, containing a hydroxyl group as a reactive functional group) was used in an amount of 9.0 g (20 parts by weight, based on 100 parts by weight of the silicone derivative), instead of 9.0 g of the aqueous dispersion of zirconium oxide "NZD-3007," and that a poly(methyl silsesquioxane) derivative [trade name "KR500," commercially available from Shin-Etsu Chemical Co., Ltd., in which $R^1$, $R^2$, $R^3$ and $R^4$ of the formula (I) are each a methyl group, molecular weight: from 1000 to 2000, methoxy content 28% by weight] was used in an amount of 5.0 g, instead of 5.0 g of the poly(methyl silsesquioxane) derivative "X-40-9225," in Example 1-1, to obtain a silicone resin composition and a formed article made therefrom (formed article a).

Example 1-3

The same procedures as in Example 1-1 were carried out except that an aqueous dispersion of alumina having an average particle size of from 50 to 60 nm (trade name "Alumina Sol 520," commercially available from Nissan Chemical Industries, Ltd., solid content: 30% by weight, containing a hydroxyl group as a reactive functional group, content of reactive functional group: 1.0% by weight or more) was used in an amount of 9.0 g (30 parts by weight, based on 100 parts by weight of the silicone derivative), instead of 9.0 g of the aqueous dispersion of zirconium oxide "NZD-3007" in Example 1-1, to obtain a silicone resin composition and a formed article made therefrom (formed article a).

Example 1-4

The same procedures as in Example 1-1 were carried out except that a disilanol derivative [trade name "X-21-5841," commercially available from Shin-Etsu Chemical Co., Ltd., in which $R^5$, $R^6$ and $R^7$ of the formula (III) are each a methyl group, molecular weight: about 1000, functional group equivalency: 600] was used in an amount of 4.0 g, instead of 4.0 g of the disilanol derivative "X-21-3153" in Example 1-1, to obtain a silicone resin composition and a formed article made therefrom (formed article a). The amount of the fine metal oxide particles used was 40 parts by weight, based on 100 parts by weight of the silicone derivative.

The properties of the resulting formed article made from the composition were evaluated in accordance with the methods of Test Examples 1-1 and 1-2.
The results are shown in Table 1. The results for light transmittance (transmittance, %) of the composition are also shown in the table.

Test Example 1-1

Elastic Modulus

The elastic modulus at 25° C. is measured with a viscoelasticity spectrometer (DMA, commercially available from Seiko Instruments, Inc.).

Test Example 1-2

Flexibility

Each of the silicone resin compositions having a film thickness of a 100 μM is wound around a tube having a diameter of from 1 mm to 0.1 mm. The surface state of the silicone resin composition is visually observed, and a diameter of the tube at which the surface of the composition cracks is used as an index for flexibility. It is evaluated such that the smaller the diameter, the higher the flexibility.

TABLE 1

| | Formed Article | Transmittance (%) | Elastic Modulus (Pa) | Diameter (mm) |
|---|---|---|---|---|
| Example 1-1 | a | 93 | $2.60 \times 10^8$ | 0.1 |
| | b | 94 | $1.70 \times 10^7$ | Not cracked at 0.1 mm |
| Example 1-2 | a | 98 | $2.20 \times 10^8$ | 0.1 |
| Example 1-3 | a | 89 | $1.60 \times 10^8$ | 0.1 |
| Example 1-4 | a | 93 | $1.50 \times 10^7$ | Not cracked at 0.1 mm |

It can be seen from the results of Table 1 that the compositions of Examples have high light transmittance, and the formed articles have high flexibility while having high elastic moduli.

Example 2-1

In a container equipped with a stirrer, a reflux condenser, and a nitrogen inlet tube, an aqueous dispersion of zirconium oxide having an average particle size of 7 nm (trade name "NZD-3007," commercially available from Sumitomo Osaka Cement Co., Ltd., solid content: 40% by weight, containing a hydroxyl group as a reactive functional group, content of reactive functional group: 1.0% by weight or more) as fine metal oxide particles having a reactive functional group on the surface thereof was placed in an amount of 10.0 g (22 parts by weight, based on 100 parts by weight of the silicone derivative), and further 10.0 g of methanol and 10.0 g of 2-methoxyethanol were added thereto, and a pH of the solution was adjusted with a concentrated hydrochloric acid to 2.5 to 3.3. Thereto was added dropwise a solution prepared by dissolving 16.0 g of a poly(methyl silsesquioxane) derivative having an alkoxysilyl group at an end of a molecule [trade name "X-40-9225," commercially available from Shin-Etsu Chemical Co., Ltd., in which $R^1$, $R^2$, $R^3$ and $R^4$ of the formula (I) are each a methyl group, molecular weight: from 2000 to 3000, methoxy content 24% by weight] in 16.0 g of 2-propanol over a period of 20 minutes with a dropping funnel, and the components were reacted at 60° C. for 1 hour. Thereafter, 2.5 g of a monofunctional silane derivative methoxytrimethylsilane [trade name "LS-510," commercially available from Shin-Etsu Chemical Co., Ltd., in which X of the formula (II) is a methoxy group, molecular weight: 104.2], the weight ratio of the poly(methyl silsesquioxane) derivative to the monofunctional silane derivative being 86/14, was added dropwise thereto, and the components were reacted at 60° C. for 2 hours. Thereafter, the reaction mixture was cooled to room temperature, 25° C., to give a silicone resin composition. The solvents were distilled off under a reduced pressure to concentrate the resulting composition, and the concentrate was applied to a PET substrate subjected to a removal treatment with a silicone-based remover so as to form a film having a thickness of 100 μm, and heated at 100° C. for 3 minutes to prepare a silicone-based, transparent, pressure sensitive adhesive sheet. Here, the resulting adhesive sheet was not tacky at room temperature and exhibited tackiness by heating at 60° C.

Example 2-2

The same procedures as in Example 2-1 were carried out except that a poly(methyl silsesquioxane) derivative [trade name "KR500," commercially available from Shin-Etsu Chemical Co., Ltd., in which $R^1$, $R^2$, $R^3$ and $R^4$ of the formula (I) are each a methyl group, molecular weight: from 1000 to 2000, methoxy content: 28% by weight] was used in an amount of 16.0 g, instead of 16.0 g of the poly(methyl silsesquioxane) derivative "X-40-9225" in Example 2-1, to obtain a silicone resin composition and an adhesive sheet made therefrom. Here, the resulting adhesive sheet was not tacky at room temperature and exhibited tackiness by heating at 60° C.

Example 2-3

The same procedures as in Example 2-1 were carried out except that a poly(methyl silsesquioxane) derivative [trade name "KC89," commercially available from Shin-Etsu Chemical Co., Ltd., in which $R^1$, $R^2$, $R^3$ and $R^4$ of the formula (I) are each a methyl group, molecular weight: about 400, methoxy content: 46% by weight] was used in an amount of 16.0 g, instead of 16.0 g of the poly(methyl silsesquioxane) derivative "X-40-9225" in Example 2-1, to obtain a silicone resin composition and an adhesive sheet made therefrom. Here, the resulting adhesive sheet was not tacky at room temperature and exhibited tackiness by heating at 60° C.

Example 2-4

The same procedures as in Example 2-1 were carried out except that 2.5 g of chlorotrimethylsilane [trade name "KA31," commercially available from Shin-Etsu Chemical Co., Ltd., in which X of the formula (II) is a chlorine atom, molecular weight: 108.6] was used, instead of 2.5 g of the monofunctional silane derivative methoxytrimethylsilane "LS-510" in Example 2-1, to obtain a silicone resin composition and an adhesive sheet made therefrom. Here, the resulting adhesive sheet was not tacky at room temperature and exhibited tackiness by heating at 60° C.

Example 2-5

In the same apparatus as in Example 2-1, an aqueous dispersion of silica (trade name "Colloidal Silica O," commercially available from Nissan Chemical Industries, Ltd., solid content: 20% by weight, containing a hydroxyl group as a reactive functional group) was placed in an amount of 25.8 g (22 parts by weight based on 100 parts by weight of the silicone derivative), and further 20.0 g of methanol and 20.0 g of 2-methoxyethanol were added thereto. Thereto a solution prepared by dissolving 20.0 g of the poly(methyl silsesquioxane) derivative "KR500" in 24.0 g of 2-propanol was then added dropwise with a dropping funnel, and the components were reacted at 60° C. for 1 hour. Further, 3.0 g of the methoxytrimethylsilane "LS-510" was then added dropwise with a dropping funnel so that a weight ratio of the poly(methyl silsesquioxane) derivative to the monofunctional silane derivative was 87/13, the components were reacted at 60° C. for 2 hours, and the reaction mixture was then cooled to room temperature, 25° C., to obtain a silicone resin composition. The resulting composition was formed in the same manner as in Example 2-1, to give an adhesive sheet. Here, the resulting adhesive sheet was not tacky at room temperature and exhibited tackiness by heating at 60° C.

Example 2-6

In the same apparatus as in Example 2-1, an aqueous dispersion of alumina (trade name "Alumina Sol 520," commercially available from Nissan Chemical Industries, Ltd., solid content: 20% by weight, containing a hydroxyl group as a reactive functional group) was placed in an amount of 25.0 g (22 parts by weight based on 100 parts by weight of the silicone derivative), and further 20.0 g of methanol and 20.0 g of 2-methoxyethanol were added thereto. Thereto a solution prepared by dissolving 20.0 g of the poly(methyl silsesquioxane) derivative "X-40-9225" in 24.0 g of 2-propanol was then added dropwise with a dropping funnel, and the components were reacted at 60° C. for 1 hour. Further, 2.5 g of the methoxytrimethylsilane "LS-510" was then added dropwise with a dropping funnel so that a weight ratio of the poly(methyl silsesquioxane) derivative to the monofunctional silane derivative was 89/11, the components were reacted at 60° C. for 2 hours, and the reaction mixture was then cooled to room temperature, 25° C., to obtain a silicone resin composition. The resulting composition was formed in the same manner as in Example 2-1, to give an adhesive sheet. Here, the resulting adhesive sheet was not tacky at room temperature and exhibited tackiness by heating at 60° C.

Example 2-7

The same procedures as in Example 2-1 were carried out except that the aqueous dispersion of zirconium oxide "NZD-3007" was used in an amount of 15.0 g (32 parts by weight, based on 100 parts by weight of the silicone derivative) instead of that of 10.0 g in Example 2-1, to obtain a silicone resin composition and an adhesive sheet made therefrom. Here, the resulting adhesive sheet was not tacky at room temperature and exhibited tackiness by heating at 60° C.

Example 2-8

The same procedures as in Example 2-1 were carried out except that a poly(methyl silsesquioxane) derivative [trade name: "X-40-9246," commercially available from Shin-Etsu Chemical Co., Ltd., a partially hydrolyzed condensate of a bifunctional alkoxysilane and a trifunctional alkoxysilane, molecular weight: from 3000 to 5000, methoxy content: 12% by weight] was used in an amount of 16.0 g instead of 16.0 g of the poly(methyl silsesquioxane) derivative "X-40-9225" in Example 2-1, to obtain a silicone resin composition and an adhesive sheet made therefrom. Here, the resulting adhesive sheet was not tacky at room temperature and exhibited tackiness by heating at 60° C.

Comparative Example 2-1

The same procedures as in Example 2-1 were carried out except that the monofunctional silane derivative in Example 2-1 was not used, to obtain a silicone resin composition and an adhesive sheet made therefrom. The amount of the fine metal oxide particles used was 25 parts by weight, based on 100 parts by weight of the silicone derivative. Here, the resulting adhesive sheet was already tacky at room temperature and exhibited an even more stronger tackiness by heating at 60° C.

Comparative Example 2-2

The same procedures as in Example 2-1 were carried out except that 2.5 g of a bifunctional silane derivative dimethoxydimethylsilanechlorotrimethylsilane ("KBM22," commercially available from Shin-Etsu Chemical Co., Ltd.) was used instead of 2.5 g of the monofunctional silane derivative methoxytrimethylsilane "LS-510" in Example 2-1, to obtain a silicone resin composition and an adhesive sheet made therefrom. Here, the resulting adhesive sheet was already tacky at room temperature and exhibited an even more stronger tackiness by heating at 60° C.

The properties of the resulting adhesive sheet were evaluated in accordance with the method of Test Example 2-1 explained below. The results are shown in Table 2. Also, the results for light transmittance (transmittance, %) of the composition are shown together. Here, the properties of Reference Example 2-1: a commercially available adhesive agent (trade name "SD4560," commercially available from Toray-Dow Corning) and Reference Example 2-2: a commercially available adhesive agent (trade name "SE9185," commercially available from Toray-Dow Corning) were evaluated in the same manner as above.

Test Example 2-1

Tensile Shearing Strength

First, each of the adhesive sheets (2 cm×2 cm) of Examples, Comparative Examples, and Reference Examples was subjected to heat-and-pressure fixing at 100° C. with a laminator to SUS (BA plate) as an object to be coated. Further, a different alumina substrate was laminated over the adhesive sheet, and subjected to heat-and-pressure fixing at 100° C. with the laminator. Thereafter, the laminated substrate was treated at 150° C. for 1 hour to carry out a heat-cure reaction, to prepare a sample for measuring tensile shearing strength.

Next, a tensile shearing strength was measured at a tensile speed of 50 mm/min on the adhered area of 2 cm×2 cm, using a universal tensile tester (AUTOGRAPH, commercially available from Shimadzu Corporation).

TABLE 2

|  | Transmittance (%) | Tensile Shearing Strength (N/mm²) | Tackiness at Room Temp. (25° C.) |
|---|---|---|---|
| Example 2-1 | 98 | 106 | Absent |
| Example 2-2 | 96 | 108 | Absent |
| Example 2-3 | 96 | 90 | Absent |
| Example 2-4 | 96 | 107 | Absent |
| Example 2-5 | 94 | 103 | Absent |
| Example 2-6 | 84 | 101 | Absent |
| Example 2-7 | 92 | 68 | Absent |
| Example 2-8 | 96 | 105 | Absent |
| Comparative Example 2-1 | 96 | 116 | Present |
| Comparative Example 2-2 | 94 | 92 | Present |
| Reference Example 2-1 | — | 52 | Present |
| Reference Example 2-2 | — | 145 | Present |

It can be seen from the results of Table 2 that the compositions of Examples have high light transmittance, and formed articles, adhesive sheets made therefrom have high tensile shearing strength, and are not tacky at room temperature, showing excellent handling property, and at the same time having excellent adhesiveness because tackiness is exhibited by heating. In addition, all of the compositions of Examples have substantially the same transmittance even when allowed to stand at 200° C. for 500 hours, showing excellent heat resistance.

The silicone resin composition of the present invention can be suitably used as, for example, materials for encapsulating photosemiconductor elements for use in backlights for liquid crystal displays, traffic lights, outdoor big displays, advertisement sign boards, and the like.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A composition comprising:
   a poly(methyl silsesquioxane) derivative having an alkoxysilyl group at an end of a molecule;
   fine metal oxide particles having a reactive functional group on the surface thereof; and
   at least one compound selected from the group consisting of a disilanol derivative having a silanol group at both ends of a molecule and a monofunctional silane derivative represented by formula (II):

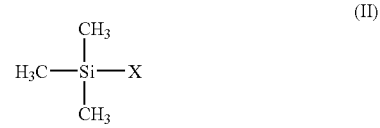

wherein X is an alkoxy group or a halogen atom, wherein the poly(methyl silsesquioxane) derivative comprises at least one compound represented by formula (I)

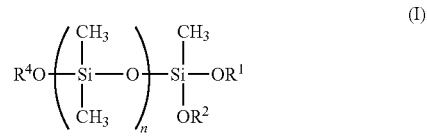

Where each of $R^1$, $R^2$, $R^3$ and $R^4$ is independently an alkyl group or an aromatic group, n is a positive integer, $R^1$, $R^2$, and $R^4$ are not concurrently aromatic groups, and n number of $R^3$'s may be identical or different.

2. The composition according to claim 1, wherein the fine metal oxide particles have an average particle size of from 1 to 100 nm.

3. The composition according to claim 1, wherein the composition comprises the fine metal oxide particles dispersed in water, an alcohol, or a mixture thereof.

4. The composition according to claim 1, wherein an alkoxy group content is from 10 to 50% by weight per one molecule of the poly(methyl silsesquioxane) derivative.

5. The composition according to claim 1, wherein the disilanol derivative having a silanol group at both ends of a molecule is included, and the silanol group has a functional group equivalency of from 100 to 1000.

6. The composition according to claim 1, wherein $OR^1$, $OR^2$, $OR^3$, and $OR^4$ are methoxy groups.

7. The composition according to claim 1, wherein the disilanol derivative having a silanol group at both ends of a molecule is included, and the poly(methyl silsesquioxane) derivative is included in an amount of 70 to 90% by weight.

8. The composition according to claim 1, wherein the poly(methyl silsesquioxane) derivative and the monofunctional silane derivative represented by the formula (II) are included in a weight ratio of from 80/20 to 90/10.

9. A silicone resin composition obtained by a process comprising:

carrying out a first polymerization reaction between fine metal oxide particles having a reactive functional group on the surface thereof and a poly(methyl silsesquioxane) derivative having an alkoxysilyl group at an end of a molecule such that a cross-linked polymer is formed, and carrying out a second polymerization reaction between the cross-linked polymer and at least one compound selected from the group consisting of a disilanol derivative having a silanol group at both ends of a molecule and a monofunctional silane derivative represented by formula (II):

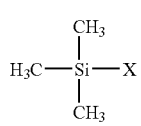
(II)

wherein X is an alkoxy group or a halogen atom, wherein the poly(methyl silsesquioxane) derivative comprises at least one compound represented by formula (I)

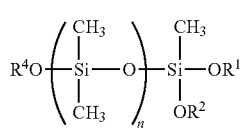
(I)

Where each of $R^1$, $R^2$, $R^3$ and $R^4$ is independently an alkyl group or an aromatic group, n is a positive integer, $R^1$, $R^2$, and $R^4$ are not concurrently aromatic groups, and n number of $R^3$'s may be identical or different.

10. The silicone resin composition according to claim 9, wherein the first polymerization reaction is carried out in a dispersion of the fine metal oxide particles in water, an alcohol, or a mixture thereof.

11. A silicone resin formed article comprising:
a molded body produced by molding the silicone resin composition as defined in claim 9.

12. The silicone resin formed article according to claim 11, wherein the formed article is at least one member selected from the group consisting of high-refractive index silicone resins, microlens, materials for encapsulating photosemiconductor elements, pressure sensitive adhesives, sealants, silicone sheets, flexible substrates, and silicone-based transparent pressure sensitive adhesive sheets.

13. The composition according to claim 9, wherein the disilanol derivative having a silanol group at both ends of a molecule is included, and the silanol group has a functional group equivalency of from 100 to 1000.

14. A method for producing a silicone resin composition, comprising:
carrying out a first polymerization reaction between fine metal oxide particles having a reactive functional group on the surface thereof and a poly(methyl silsesquioxane) derivative having an alkoxysilyl group at an end of a molecule such that a cross-linked polymer is formed; and carrying out a second polymerization reaction between the cross-linked polymer and at least one compound selected from the group consisting of a disilanol derivative having a silanol group at both ends of a molecule and a monofunctional silane derivative represented by formula (II):

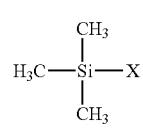
(II)

wherein X is an alkoxy group or a halogen atom, wherein the poly(methyl silsesquioxane) derivative comprises at least one compound represented by formula (I)

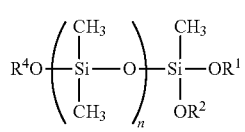
(I)

Where each of $R^1$, $R^2$, $R^3$ and $R^4$ is independently an alkyl group or an aromatic group, n is a positive integer, $R^1$, $R^2$, and $R^4$ are not concurrently aromatic groups, and n number of $R^3$'s may be identical or different.

15. The method according to claim 14, wherein the second polymerization reaction involves the disilanol derivative having a silanol group at both ends of a molecule, and the silanol group has a functional group equivalency of from 100 to 1000.

* * * * *